United States Patent [19]

Hayes, Jr.

[11] 4,430,396
[45] Feb. 7, 1984

[54] BATTERY TERMINAL POST SEAL

[75] Inventor: William B. Hayes, Jr., Cinnaminson, N.J.

[73] Assignee: GNB Batteries, Inc., Mendota Heights, Minn.

[21] Appl. No.: 332,708

[22] Filed: Dec. 21, 1981

[51] Int. Cl.³ .............................................. H01M 2/08
[52] U.S. Cl. ..................... 429/184; 429/185
[58] Field of Search .................. 429/184, 181–183, 429/185

[56] References Cited

U.S. PATENT DOCUMENTS

| 2,512,080 | 6/1950 | Wilson | 429/184 |
| 3,652,540 | 3/1972 | Sharpe et al. | 429/184 |
| 4,117,211 | 9/1978 | Schuster | 429/184 X |
| 4,212,934 | 7/1980 | Salamon | 429/181 |
| 4,245,014 | 1/1981 | Veit, Jr. et al. | 429/184 X |
| 4,288,504 | 9/1981 | Julian et al. | 429/181 X |
| 4,331,748 | 5/1982 | Hardigg et al. | |

Primary Examiner—Charles F. LeFevour

[57] ABSTRACT

A battery terminal post seal manufacture wherein a battery terminal post (14) is sealed to a battery case wall portion (12) by a body of sealing material (17) fixedly sealed to the terminal post and movably sealed to the portion of the battery case defining the opening (13) through which the terminal post extends. In one form, the sealing space (16) receiving the flowable sealing material is defined by inner and outer peripheral encircling ribs (18,19) on the terminal post. In another form, the outer closure (122) of the sealing space is defined by a cap (122) removably mounted to the terminal post end (123) by a threaded element (126). In another form, the terminal post is provided with a peripheral recess (227) within the battery case opening (213), with the post (214) having snug fit with the battery case in the opening so as to define the lowermost sealant dam. The invention comprehends forming the seal by introducing the sealant material in flowable form in situ with the structure defining the sealing space within the battery case opening. The invention comprehends determination of the completion of the filling operation by observation of the level of the sealing material in the seal space. In one form, observation is provided by a sight opening (21), in another form observation is provided by the filling of the sealing space prior to the mounting of the closure member to the terminal post, and in another form, a sight opening (221) is provided in the terminal post.

19 Claims, 4 Drawing Figures

4,430,396

BATTERY TERMINAL POST SEAL

TECHNICAL FIELD

This invention relates to electrical batteries and in particular to a seal for sealing a terminal post to a battery case wall.

BACKGROUND OF THE INVENTION

In a lead-acid storage battery, positive and negative battery posts are provided and normally these posts protrude through the battery cover wall. These posts are electrically connected below the cover to a lead or lead alloy grid form containing active battery paste material and this construction normally results in a rigid structure. Some form of liquid-tight seal is usually provided between the cover and terminal post to preclude leakage of electrolyte. Due to gradual electrode plate enlargement, commonly referred to as "grid growth," during battery cycle life, the plates produce vertical forces on the electrode plate-terminal structure. These internal forces cause the terminal post to be pushed upward thereby destroying the post-to-cover seal and permitting electrolyte leakage through the broken seal if the cover and container are an integral unit, such as is the case in covers heat sealed to the containers. In batteries utilizing individual cell covers, the post is normally fused light-tight to the cover bushing and the cover is sealed to the container by asphaltic compound materials or other such flexible materials. When grid growth occurs in this configuration, the entire cover is moved vertically and will result in the cover becoming tilted and may result in electrolyte leakage through possible breakage of the cover-container seal. Considerable effort has been made to develop a reliable post-to-cover seal; however, due to various reasons, the reliability of the prior embodiments has not been satisfactory.

In the battery terminal post seal illustrated in U.S. Pat. No. 1,094,173 of James M. Skinner, spaced convolutions around each terminal post present a series of steps interlocking with the sealing compound extending between them thereby offering resistance to vertical strains tending to separate the terminals and sealing compound in which they are embedded and opposing resistance to transverse strains tending to displace the terminals with respect to the sealing compound. Failure of the seal may occur when the post moves in the vertical direction, thereby forming a separation in the seal material and permitting electrolyte leakage.

Another form of battery terminal post seal is illustrated in U.S. Pat. No. 1,434,307 of Edgar A. Miller. Sealing material is deposited in an outwardly opening well surrounding the terminal post. Such a seal has the serious disadvantage of causing the failure of the seal between the sealing material and the case wall as a result of an outward movement of the battery post due to the arrangement of the frustoconical surfaces involved.

Another form of battery terminal seal is illustrated in U.S. Pat. No. 1,460,895 of Leon A. Doughty et al. As shown therein, the post is provided with interlock ribs embedded in the sealing material. Outward movement of the terminal post in this structure may cause a movement of the post relative to the sealing material as a result of rupture of the sealing material by the ribs moving through the relatively large surrounding body.

Another form of terminal post seal is illustrated in U.S. Pat. No. 3,918,993 of Edward Adderley et al. As shown therein, the sealing material is provided in a central bore of the post having radial passages conducting the sealing material outwardly to the surrounding wall of the battery case.

Another form of battery terminal post seal is illustrated in U.S. Pat. No. 4,224,388 of Steven J. Stadnick. As shown therein, the terminal post is provided with a lower ceramic washer which acts like a piston to compress the sealant when a nut on the terminal post is tightened. Double washers are employed to maintain a minimum tension on the post.

A vexatious problem occurs in the prior art terminal post seals in that movement of the terminal post outwardly through the sealing material may expose a corroded portion of the terminal post to the sealing material thus reducing the sealing effect and, in a number of instances, causing leakage of the battery.

Disclosure of the Invention

The present invention comprehends an improved battery terminal post seal and method of forming the same which eliminates the vexatious problem of the prior art structures in a novel and simple manner.

More specifically, the invention comprehends providing a battery terminal post seal which is arranged to be fixedly sealed to the battery post and movably sealed to the portion of the case wall defining the opening through which the battery post extends. Resultingly, no corroded portion of the terminal post is caused to move into the sealing means as a result of outward movement of the terminal post, whereby long, troublefree life of the battery seal is provided.

More specifically, the invention comprehends the provision in a battery of an improved terminal structure including a case wall portion provided with a through opening defined by a peripheral sealing surface, a terminal post extending longitudinally through the opening and being provided with sealant retaining means, which in one form comprises a pair of longitudinally spaced peripheral, encircling ribs or dams disposed within the opening and projecting to the sealing surface for defining a seal space extending laterally between the terminal post and the sealing surface and longitudinally between the spaced ribs or dams, passage means for conducting flowable sealant material into the seal space from exteriorly thereof, and a body of sealing material introduced through the passage means into the sealing space fixedly sealed to the terminal post and movably sealed to the wall portion for movably sealing the terminal post to the case sealing surface.

In another form of sealant retaining means, the terminal post is provided with a peripheral, encircling first dam formed integrally therewith and being disposed within the opening, the dam projecting to the sealing surface for defining a longitudinally inner end of a seal space extending laterally between the terminal post and the sealing surface and longitudinally outwardly from the dam, the terminal post further defining an outer end exposed to outwardly of the through opening, a closure member mounted to the outer end of the post and defining a portion encircling the terminal post longitudinally outwardly of the first dam and extending to the sealing surface to define a longitudinally outer end of the seal surface, and means for securing the closure member to the terminal post permitting a body of sealing material to be introduced into the seal space prior to mounting of the closure member to the terminal post whereby the introduction of the sealing material to the space outwardly of the first dam may be observed prior to the mounting and securing of the closure member to the terminal post, the sealing material defining a body fixedly sealed to the terminal post and movably sealed to the wall portion for movably sealing the terminal post to the case sealing surface.

In still another form, the terminal post is provided with a peripheral, laterally outwardly opening recess confronting the sealing surface for defining a seal space fully within the longitudinal extent of the through opening, the cross section of the terminal post longitudinally inwardly and outwardly of the recess in the through opening being complementary to and substantially fitted in the through opening, and passage means in the terminal post longitudinally outwardly of the recess for conducting flowable sealant material into the seal space from exteriorly thereof, and a body of sealing material introduced through the passage means into the sealing space fixedly sealed to the terminal post and movably sealed to the wall portion for movably sealing the terminal post to the case sealing surface.

In broad aspect, the invention comprehends the improved method of sealing a battery post to a battery case wall having an opening through which the battery post extends including the steps of providing on the battery post a laterally outwardly opening peripheral space, and forming in situ in the battery case opening a body of sealing material effectively sealingly secured to the battery post in the space and movably sealed to the battery case wall portion defining the opening.

The manufacturing process may further include the step of introducing the sealing material into the space and visually observing the completion of the filling operation.

In one form, the method of manufacture includes the step of closing the outer end of the filled space subsequent to the filling thereof.

In other forms of the disclosed invention, the space is filled through suitable openings in an outer closure means disposed within the battery case opening during the space filling operation.

The manufacture of the present invention is extremely simple and economical while yet providing the highly improved battery seal in a novel and simple manner.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
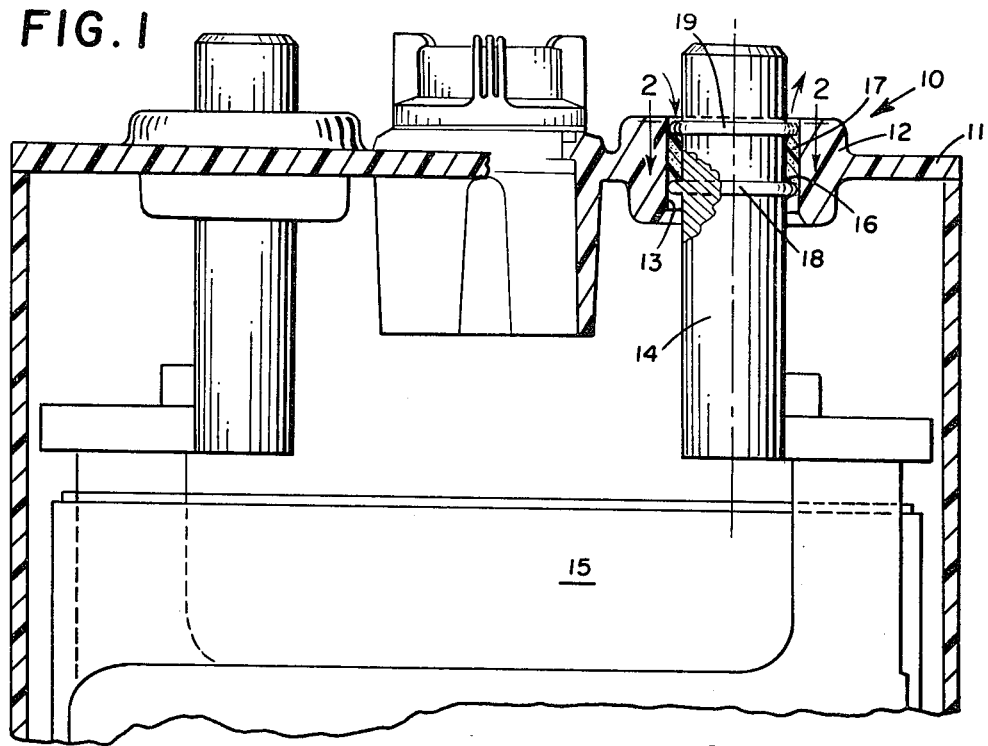
FIG. 1 is a fragmentary vertical section of a battery having a post seal embodying the invention.
Figure 2:
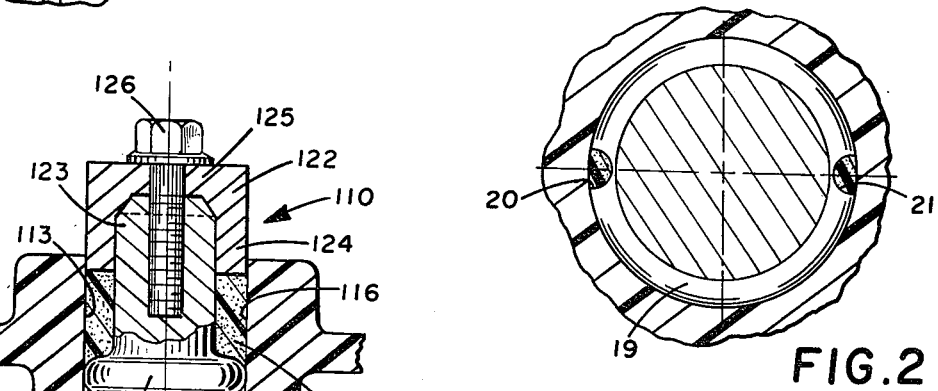
FIG. 2 is an enlarged fragmentary transverse section taken substantially along the line 2—2 of FIG. 1.

In the exemplary embodiment of the invention as illustrated in FIGS. 1 and 2 of the drawing, a battery construction generally designated 10 includes a case 11 having a top wall 12 provided with a through opening 13. A terminal post 14 extends longitudinally from within the cell space 15 in case 11 to exteriorly thereof through opening 13.

The invention comprehends the provision of a terminal post having sealant retaining means in the form of peripheral means on the terminal means within opening 13 for defining a sealing space 16 therebetween for receiving a body 17 of sealing material. The body of sealing material is effectively sealingly secured to the terminal post and movably sealed to the sealing surface of the wall portion 12 defining the opening 13. Resultingly, movement of the terminal post outwardly relative to cell space 15 through the sealing material 17 is effectively precluded.

In the embodiment of FIGS. 1 and 2, the sealant retaining means within sealing space 16 is longitudinally inwardly and outwardly defined by a pair of peripheral, encircling ribs or dams 18 and 19, respectively. In the illustrated embodiment, the ribs or dams project to the sealing surface defining opening 13 so as to have a snug fit therein for defining an effective seal space for receiving the sealing material 17.

As best seen in FIG. 2, outer rib 19 is provided with a longitudinally extending through opening 20 for conducting flowable sealant material from exteriorly of the case wall 12 into the sealing space 16 to effect the desired seal.

The invention further comprehends the provision of a second through opening 21 defining a sight opening, permitting the observation of the filling of the seal space 16 with the sealing material delivered through the fill opening 20. Thus, the complete filling of the sealing space with the sealing material may be observed by the presence of sealing material at the opening 21 as upon completion of the filling operation.

The invention comprehends the spacing of the sight opening 21 from the fill opening 20, and in the illustated embodiment of FIG. 2, the sight opening is diametrically opposite the fill opening.

In the embodiment of battery structure 10, the ribs 18 and 19 are formed integrally with the terminal posts 14. The ribs effectively define a positive sealant dam at the longitudinally inner and outer ends of the sealing space for suitably controlling the forming of the seal and assuring that the seal is sealingly secured to the terminal post to avoid relative movement between the seal and the terminal post as upon possible subsequent outward movement of the terminal post through the case wall opening 13, as discussed above.

Figure 3:
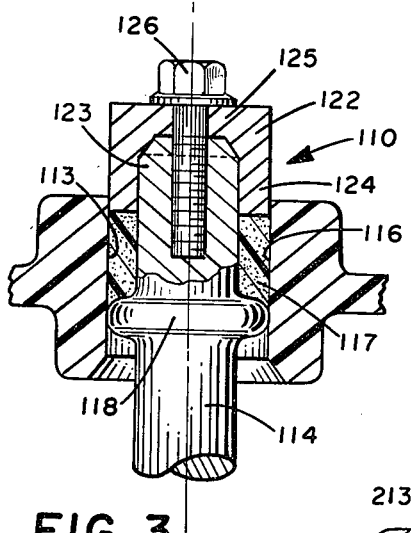
FIG. 3 is a fragmentary enlarged vertical section illustrating a modified form of battery post seal embodying the invention.

Referring now to the embodiment of FIG. 3, a modified form of battery construction generally designated 110 is shown to comprise a construction generally similar to construction 10 but wherein the sealant retaining means on the battery terminal post 114 is provided in the form of a single rib or dam 118. In lieu of the outer rib or dam 19 of construction 10, the outer end of the sealing space 116 is defined by a removable closure cap 122. In the manufacture of the battery construction 110, the sealing material 117 is introduced into the sealing space 116 prior to the mounting of the closure cap 122 to the outer end 123 of the terminal post. As seen in FIG. 3, the closure cap comprises a cup-shaped member which may have a snug fit with the outer end 123 of the terminal post so as to have the sidewall 124 thereof extend downwardly into the opening 113 for defining the outer end of the sealing space 116. The bottom, or bight, portion 125 of the cup-shaped closure member may seat against the outer end of the terminal post and may be secured thereto by a suitable screw 126 extended through the bottom portion 125 and threaded into the outer end 123 of the battery terminal post.

Thus, in the embodiment of FIG. 3, sealing material 117 may be introduced into the sealing space 116 with the outer end of the sealing space fully exposed for observation of the filling operation. When the desired level of sealing material is reached within the seal space 116, the closure cap is mounted to the outer end 123 of the terminal post and the end wall 125 thereof secured by means of the screw 126 so that the sidewall 124 cooperates with the rib 118 in defining the longitudinal boundaries of the sealing space.

As in the embodiment of FIGS. 1 and 2, the body of sealing material is effectively sealingly secured to the terminal post for movement therewith, the sealing material being movably sealed to the case wall surface 113 defining the opening through which the terminal post extends.

As in the embodiment of battery construction 10, the rib 118 projects to the wall surface 113 to form sealant retaining means and to effectively define a dam against leakage of the sealing material downwardly therepast into the cell space during the manufacturing operation.

Another form of battery construction generally designated 210 is shown to comprise a construction generally similar to construction 10 but wherein the terminal post 214 has a cross section similar to that of the battery case opening 213. A peripheral, laterally outwardly opening recess 227 is provided in the outer end of the terminal post to be received within the opening 213 for defining the seal space 216.

Figure 4:
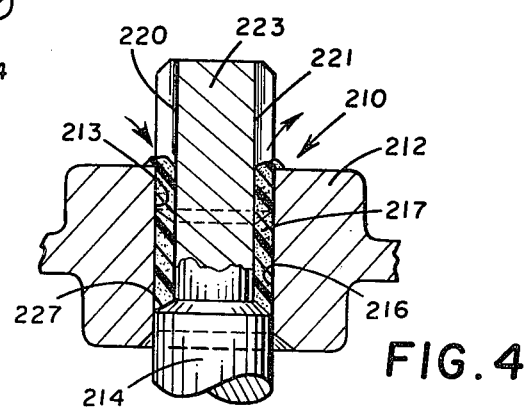
FIG. 4 is a fragmentary enlarged vertical section illustrating still another form of battery post seal embodying the invention.

As further shown in FIG. 4, the outer end 223 of the terminal post may further be provided with a longitudinally extending opening 220 defining a fill opening for introducing sealing material from outwardly of the battery wall 212 into the sealing space.

As further shown in FIG. 4, the terminal post end 223 may be provided with a second longitudinal through opening 221 defining a sight opening for observing the filling of the sealing space in a manner similar to the use of the sight opening 21 in the battery construction 10 discussed above.

As a result of the snug fit of the terminal post 214 in the opening 213, the portions of the terminal post defining the longitudinal inner and outer ends of the recess 227 effectively comprise dams for controlling the formation of the seal 217 which again is fixedly sealed to the terminal post and movably sealed to the battery case wall. This post configuration may be adapted for use with a closure cap as in FIG. 3 or for use with other configurations such as fused terminal posts, connectors and the like.

In each of the embodiments, the manufacture of the seal structure is effected by forming the seal in situ about the terminal post within the post opening of the battery case wall. In each of the embodiments, the formed seal is fixedly secured to the terminal post for movement therewith and is movably sealed to the battery case wall in the terminal post opening to maintain an effective seal between the terminal post and the battery case wall, notwithstanding such movement of the terminal post in the case wall opening.

In each of the embodiments, the lower peripheral projection on the terminal post effectively defines a dam preventing flow of the sealing material downwardly therepast into the cell space of the battery. In each of the embodiments, provision is made for observation of the completion of the filling operation during the manufacturing process for further improved facilitated low cost construction.

The fit of the projecting wall portions on the terminal post need only be sufficient to prevent a viscous sealing material from running downwardly therepast for further facilitated low cost manufacture. The provision of the means for effectively determining the completion of the filling operation again provides an improved, positive seal in a novel and simple manner.

The foregoing disclosure of specific embodiments is illustrative of the broad inventive concepts comprehended by the invention.

What is claimed is:

1. In a battery, a terminal structure comprising:
   a case wall portion provided with a through opening defined by a peripheral cylindrical sealing surface;
   a terminal post extending longitudinally through said opening and having at least one integrally formed rigid, peripheral sealant-retaining dam disposed within said opening, projecting to and engaging the lower portion of said sealing surface to define a seal space extending laterally between said terminal post and the lower portion of said sealing surface and longitudinally above said dam along said terminal post portion disposed within said opening;
   passage means for introducing and conducting flowable sealant material into said seal space from exteriorly thereof; and
   a body of viscous, flowable sealing material disposed in said sealing space, fixedly sealed to said terminal post and movably sealed to said peripheral sealing surface.

2. The battery terminal structure of claim 1, wherein said terminal post is provided with a first integrally formed rigid sealant-retaining peripheral dam positioned longitudinally on said post to project to and engage the lower surface portion of said sealing surface and a second integrally formed rigid sealant-retaining peripheral dam positioned longitudinally on said post a predetermined distance above said first dam to project to and engage the upper portion of said sealing surface and define a sealing space extending laterally from said post to said sealing surface and longitudinally between said first and second dams.

3. The battery terminal structure of claim 1, wherein said at least one integrally formed, rigid sealant-retaining peripheral dam comprises a pair of integrally formed, rigid, longitudinally spaced, peripheral dams disposed within said opening.

4. The battery terminal structure of claim 3, wherein each of said longitudinally spaced dams project to and engage said sealing surface to define a seal space extending laterally between said terminal post and said sealing surface and longitudinally along said terminal post portion disposed between said dams.

5. The battery terminal structure of claim 3, wherein said passage means comprises an opening through the uppermost of said longitudinally spaced dams to said sealing space.

6. The battery terminal structure of claim 3, wherein said passage means comprises a pair of spaced openings through the uppermost of said longitudinally spaced dams to said sealing space for concurrently permitting introduction of flowable sealing material through one of said spaced openings to said sealing space and observation through the other of said spaced openings of the level of the sealant material in said sealing space.

7. The battery terminal structure of claim 3, wherein said spaced openings are disposed at opposite sides of the terminal post.

8. The battery terminal structure of claim 1, wherein said terminal post extends outwardly from said case wall portion to define an outer end exposed to outwardly of said through opening, said outer end adapted to receive a closure member mounted thereto for sealing said sealing material disposed in said sealing space and a closure member mounted to said outer end of said post and defining a portion encircling said post longitudinally outwardly of said dam, extending to and engaging said sealing surface to define a longitudinally outer end closure of said seal space.

9. The battery terminal structure of claim 8, wherein said closure member includes means for securing said closure member to said terminal post after a body of sealing material is introduced into said seal space.

10. The battery terminal structure of claim 8, wherein said closure member comprises a cup-shaped member having a sidewall skirt portion projecting into said case opening and defining an upper dam in said opening.

11. The battery terminal structure of claim 8, wherein said closure member comprises a cup-shaped member having a sidewall skirt portion projecting into said case opening and defining an upper dam in said opening, and further including threaded securing means for securing the end wall of the cup-shaped member to said outer end of the terminal post.

12. The battery terminal structure of claim 11, wherein said threaded securing means comprises a screw extending through said end wall and threadingly engaging said outer end of the terminal post.

13. The battery terminal structure of claim 1, wherein said at least one integrally formed, rigid, peripheral sealant-retaining dam comprises a peripheral, laterally outwardly opening recess confronting said sealing surface for defining a seal space within the longitudinal extent of said through opening, the cross-section of the terminal post longitudinally inwardly and outwardly of said recess in said through opening being complementary to and substantially fitted in said through opening to form a rigid dam in sealing engagement with said sealing surface.

14. The battery terminal structure of claim 13, wherein said terminal post defines passage means longitudinally outwardly of said recess for introducing and conducting flowable sealant material into said seal space from exteriorly thereof.

15. The battery terminal structure of claim 14, wherein said terminal post defines a pair of spaced openings for concurrently permitting introduction of flowable sealing material through one of said spaced openings to said sealing space and observation through the other of said spaced openings of the level of the sealant material in said sealing space.

16. The battery terminal structure of claim 15, wherein said spaced openings are disposed at opposite sides of the terminal post.

17. The battery terminal structure of claim 13, wherein said passage means comprises portions of the terminal post defining a pair of spaced openings for concurrently permitting introduction of flowable sealing material through one of said spaced openings to said sealing space and observation through the other of said spaced openings of the level of the sealant material in said sealing space.

18. The battery terminal structure of claim 13, wherein said passage means comprises portions of the terminal post defining a pair of spaced openings for concurrently permitting introduction of flowable sealing material through one of said spaced openings to said sealing space and observation through the other of said spaced openings of the level of the sealant material in said sealing space, said spaced openings being disposed at opposite sides of the terminal post.

19. The battery terminal structure of claim 1, wherein said post outer end includes a closure member mounted to said outer end; and means for mounting the closure member to said terminal post permitting a body of sealing material to be introduced into said seal space prior to mounting of the closure member to the terminal post whereby the introduction of said sealing material to the space outwardly of said dam may be observed prior to the mounting of the closure member to the terminal post, said sealing material defining a body fixedly sealed to said terminal post and movably sealed to said wall portion for movably sealing the terminal post to said case sealing surface.

* * * * *